United States Patent [19]

Englund et al.

[11] Patent Number: 4,680,749
[45] Date of Patent: Jul. 14, 1987

[54] DUPLEX RADIO TRANSCEIVER HAVING IMPROVED DATA/TONE AND AUDIO MODULATION ARCHITECTURE

[75] Inventors: Arvid E. Englund; Stephen R. Wynn; Rodney A. Dolman, all of Lynchburg, Va.; Frederick J. Highton, Tucson, Ariz.; Rickey D. Harris, Forest, Va.

[73] Assignee: General Electric Company, Lynchburg, Va.

[21] Appl. No.: 734,369

[22] Filed: May 15, 1985

[51] Int. Cl.⁴ .............................................. H04J 9/00
[52] U.S. Cl. ........................................ 370/11; 370/24
[58] Field of Search ................. 370/11, 24, 32; 375/5, 375/9, 48; 455/76, 86

[56] References Cited

U.S. PATENT DOCUMENTS

| | | | |
|---|---|---|---|
| 2,776,429 | 1/1957 | Olerud | 370/11 |
| 3,160,812 | 12/1964 | Scantlin | 375/42 |
| 3,178,515 | 4/1965 | Bramer et al. | 370/11 |
| 3,603,882 | 9/1971 | Wilson | 370/11 |
| 3,916,412 | 10/1975 | Amoroso, Jr. | 455/86 |
| 3,962,638 | 6/1976 | Sallis | 375/9 |
| 4,131,849 | 12/1978 | Freeburg et al. | 375/5 |
| 4,225,969 | 9/1980 | Hong | 455/86 |
| 4,520,474 | 5/1985 | Vitmur | 455/76 |

*Primary Examiner*—Douglas W. Olms
*Assistant Examiner*—Wellington Chin
*Attorney, Agent, or Firm*—Nixon & Vanderhye

[57] ABSTRACT

A novel circuit architecture is disclosed for achieving audio, tone, and digital data signal modulation in a full duplex radio transceiver. A single signal source is utilized to generate both transmitted carrier and receiver local oscillator injection signals. Yet the architecture is such that the transmitted data does not appear at the receiver's discriminator output—while a "side tone" of transmitted audio does so appear. The audio to be transmitted is used to frequency modulate a VCO and provide the receiver first mixer injection signal as well as a "carrier" input to a phase modulator. The data/tone signals are on the other hand, combined and integrated in a complex waveform and input to control the phase modulator. The resulting FM (data/tone and voice) output from the phase modulator is then input to a conventional duplexed r.f. transmitter.

27 Claims, 2 Drawing Figures

DUPLEX RADIO TRANSCEIVER HAVING IMPROVED DATA/TONE AND AUDIO MODULATION ARCHITECTURE

BACKGROUND OF THE INVENTION

This invention relates to modulation of data, tone and audio signals in a duplex radio communications system. More particularly, this invention relates to a simplified circuit architecture for achieving such modulation.

Two-way mobile radio communications systems are growing in popularity, complexity, and cost. Typically, such a system includes a base station and a plurality of mobile stations organized to provide radio communications services among the various mobile stations. Such a system usually allocates one channel to the base station to receive incoming signals from the mobile stations. The base station is allocated a second channel to provide output signals to the mobile stations. Until recently, most of the mobile radio communications included systems designed to handle only voice signals.

However, with the emergence of the mobile digital data terminals, it was found possible to combine the mobile voice terminals with the mobile digital data terminals in a mobile station to provide voice as well as digital data communication capabilities. In addition, it was discovered that purely voice communication systems could be greatly improved by the use of digital data and tone signals (e.g. supervisory audio tones or "SAT") for addressing, handshaking and transmitting status, control or other information among the mobile stations and/or with the base station.

Thus, there has developed a need for a mobile radio station capable of simultaneously handling audio, tone and digital data signals. Many prior art voice/data shared two-way mobile radio systems are capable of operating only in a simplex mode. However, it has been found that demand placed on the channel capacity of the system was compounded when digital data signal transmission is added and thus full duplex channels are sometimes desirable.

In order to provide a full duplex radio communication system capable of handling audio, tone and digital data signals, it is necessary to provide a modulation scheme capable of modulating both audio, tone and digital data signals so that the required data, tone, and audio signals may be received and transmitted at the same time.

Modulation of a single frequency source that is used to provide both transmitter carrier and the first receiver mixer injection frequency signal is somewhat difficult for duplex data. In such a case, both received and transmitted data would be present at the receiver output. However, this mix of data will be corrupted in both phase and amplitude because, at times, the modulated local oscillator injection and the incoming signal will mix to generate an IF signal that consumes more spectrum than the receiver IF bandwidth can pass. Increasing the bandwidth typically is not possible because of external system parameters (e.g. such as FCC channel spacing requirements).

In addition, methods of phase cancellation of the transmitted data at the receiver output are not practical, in part because of typical requirements for complex data recovery techniques. One possible solution to this problem is proposed in U.S. Pat. No. 3,160,812 to Scantlin entitled "Composite Transmission System Utilizing Phase Shift And Amplitude Modulation" issued on Dec. 8, 1964. Scantlin proposes generating a single RF carrier, varying the phase of the carrier as a function of the digital data, amplitude modulating the carrier as a function of the audio signal frequency and radiating the shifted modulated carrier. Besides requiring complex circuitry, and thus increased cost, Scantlin uses separate frequency sources for the transmitter carrier and the receiver mixer injection.

Another possible solution is proposed in U.S. Pat. No. 3,962,638 to Sallis, entitled "Data Transmission Over Voice Bandwidth of FM Radio Channel", issued June 8, 1976. FIG. 2 of Sallis shows a transceiver circuit in which data signals are input to a transmitter oscillator and then to a phase modulator while voice signals are input through a voice input circuit and then to the phase modulator. However, the receiver mixer injection frequency is not derived from either the transmitter oscillator or the phase modulator. Therefore, such a device would require additional synthesizers and thus increase the complexity of the circuit and the cost of the transceiver system.

Yet another possible solution is proposed in U.S. Pat. No. 4,131,849 to Freeburg et al, entitled "Two-Way Mobile Radio Voice/Data Shared Communications System", issued Dec. 26, 1978. Essentially, Freeburg et al permit or inhibit transmission of digital data and voice signals selectively in a way that enables the system to operate in a full duplex mode of operation. However, this circuitry is provided at the base station where separate antennas and separate channels are provided for the received signal and the transmitted signal. Thus, there is no need to provide a single frequency source that is used both for the transmitter carrier and the receiver mixer injection frequencies.

Therefore, there remains a need for a low-cost, simplified modulation scheme for modulating both digital data, tone and audio signals in a full duplex mobile radio transceiver.

Another approach to provide the necessary digital, tone, and audio modulation is to directly drive all the signals simultaneously into a phase modulator following the single synthesizer output which is placed in the transmit branch only. This approach is that proposed for the original Advanced Mobile Phone System Studies. However, the proposal required the synthesizer to operate at one-fourth the desired transmit frequency to achieve the necessary phase deviation at the final transmit frequency. This is due to the fact that a practical phase modulator can only achieve about one-fourth the desired deviation, and frequency multiplication times four gets the deviation where it must be. The latest radio designs which are more simple and lower cost require the synthesizer to operate at the desired transmit frequency and avoid multiplication. The original Bell proposal thus becomes much more difficult because multiple phase modulators in series would be required to achieve the desired phase deviation and this is costly and difficult to do.

SUMMARY OF THE INVENTION

However, by removing the voice (audio) modulation from the data and tone modulation one can greatly reduce the amount of phase deviation required. This is primarily due to the fact that when Manchester Encoded Data is used (as in cellular systems) and where the tones are of high enough frequency (as in cellular) then the lower frequency components of the modulation are considerably lower in amplitude than they would be for voice (audio) modulation. According to phase/frequency modulation theory which is well known in the art, to provide a flat frequency deviation response vs. modulation frequency from a phase modulator requires doubling the phase deviation when the modulating frequency is cut in half. Fortunately, for Manchester data the frequency spectrum amplitude tends to decrease with lower frequencies faster than the phase modulator deviation requirement increases (as mentioned previously). Thus the lower frequency components present in voice (audio) often require several times the phase deviation of the digital data and tones.

The digital data and tones are transmitted with this invention by way of a phase modulator in the transmit path only and the audio is directly FM modulated in a single synthesizer source which is then provided to both the transmit and receive frequency injection points. The signal which goes into the receiver is called a sidetone as in a telephone whereby you hear your own voice. The level of this sidetone can then be adjusted to provide the listener with the proper level which most closely approximates typical telephone performance (e.g. see U.S. Pat. No. 3,916,412—Amoroso, Jr.).

The present invention provides a low-cost modulation circuit architecture which may be used to modulate both digital data, audio and tone signals in a full duplex mobile radio transceiver. It also advantageously requires but a single frequency source (e.g. VCO) to generate both the transmitter carrier signal and the receiver mixer injection signal in a low-cost, full duplex mobile radio transceiver.

Such improvement is possible, for example, by frequency modulating a single VCO having FM output which is used as a local oscillator injection signal in the receiver and as the carrier input to a phase modulator. The data and tone signals are summed and integrated to provide a complex waveform used as the modulating control input to the phase modulator. (Note the tone does not require integration and may be summed after the data is integrated.) The resulting FM output of the phase modulator is then input to conventional transmitter circuits. In effect if a signal is integrated and is used to phase modulate a carrier the overall result is frequency modulation. However, the system may if desired, not integrate and use the tone and data as purely PM but this will require the proper detection and/or integration at the receiver to adequately detect the desired signal.

The receiver receives incoming digital data/tone FM and voice (FM) signals from the antenna and also outgoing voice (FM) via the local oscillator injection signal. Thus, the receiver FM discriminator outputs a detected signal including received data, received tone, received audio, and transmitted "side tone" information. Such detected signals may be provided to conventional audio and data processing and control circuits which output the received audio, received data, and transmitted side tone audio signals to suitable destinations. For example, the SAT tone and data signals may be utilized within the control circuit. Some or all of the data signals may be provided to other processing or display circuits and the audio signals may ultimately pass to an audio speaker or other transducer for interfacing with a human operator. Typically, the control circuits also serve to interface with a microphone and/or other input devices so as to provide voice, data, and tone signals for transmission.

BRIEF DESCRIPTION OF THE DRAWINGS

These and other objects and advantages of the present invention will be more clearly appreciated from the following detailed description of an illustrative embodiment of the present invention in conjunction with the accompanying drawings in which.

DETAILED DESCRIPTION OF THE PREFERRED EMBODIMENTS

Figure 1:
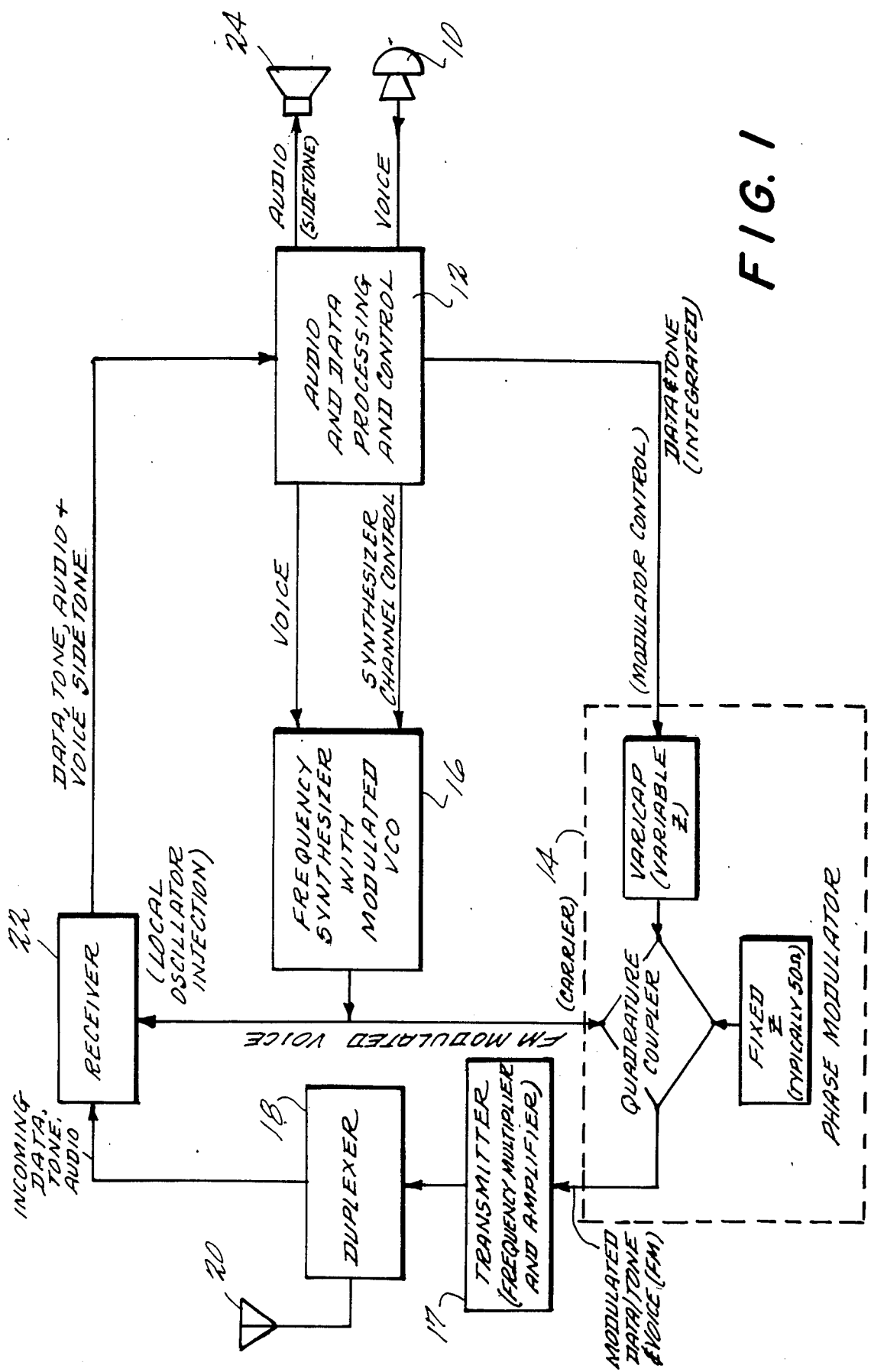
FIG. 1 shows a block diagram of a first embodiment of the present invention.

FIG. 1 is a block diagram of a first embodiment of a transceiver in accordance with the present invention. Input voice signals are received at the microphone 10 and passed to the audio and data processing and control circuit 12. Additionally, externally generated digital data may be received at the audio and data processing and control circuit 12 through a digital data port (not shown).

The audio and data processing and control circuit 12 may itself generate conventional digital data and tone (SAT) signals which may be used by the mobile transceiver in performing handshake and control functions with respect to the base station and other mobile transceivers.

The audio and data processing and control circuit 12 is provided with a conventional summing circuit which integrates the data and tone signals into a single complex waveform so that they can be commonly applied to the modulation control input of conventional phase modulator 14. The data signal may be a typical Manchester encoded square wave signal with varying duty cycle while the tone signal is usually a sinusoid analog signal. Thus, the output of the integrator is a complex waveform representing both data and tone signals.

The audio and data processing and control circuit 12 also provides analog voice signals (corresponding to the input voice signal from microphone 10) and synthesizer channel control signals to the synthesizer 16. The channel control signal may be a digital word which directs the synthesizer to a particular frequency channel for a given communication session. Significantly, the voice signals are not directly provided to the phase modulator, but to the synthesizer VCO itself and then to the phase modulator which adds data and tone modulation.

Synthesizer 16 may be a conventional frequency synthesizer with a modulated voltage controlled oscillator (VCO). The mean VCO operating frequency of synthesizer 16 may be controlled by the synthesizer channel control signals as previously mentioned. Thus, the voice signals to be transmitted are frequency modulated at synthesizer 16 which outputs an FM voice modulated signal.

Phase modulator 14 may be a conventional phase modulator which receives the integrated data and tone signals (as a modulator control input) from the audio and data processing and control circuit 12, and the FM voice signal (as the carrier input) from the synthesizer 16. In this embodiment, the phase modulator 14 is designed to require plus/minus 1.25 radian modulation. It may, for example, use a four port quadrature coupler as a phase shifter with a variable reactive termination at one port (e.g. a varicap) to achieve phase modulation. Another port receives the "carrier" while a third port may simply be terminated in a characteristic fixed impedance (e.g. 50 ohms). The resulting FM output from the fourth port of such a quadrature coupler may then be applied to conventional transmitter circuits 17 (e.g. frequency multiplexers, amplifiers, etc.) and then on to a conventional duplexer 18 for transmission by r.f. antenna 20. Other conventional phase modulator circuits may alternatively be used as will be appreciated.

On the receive side, antenna 20 receives a modulated signal containing data/tone (FM) and audio (FM) signals. These received signals pass through duplexer 18 to a conventional receiver 22. Also received by receiver 22 (via the local oscillator injection signal) is the FM voice signal from the synthesizer 16 which adds a "side tone" of the transmitted voice to the receiver discriminator output.

Receiver 22 may be a conventional cellular dual conversion FM receiver. The receiver includes a first mixer which uses the synthesizer/modulated VCO signal as an injection signal to mix with the incoming signal and generate a first IF signal. The first IF signal may typically be filtered by a crystal filter network and then applied to a further mixer/IF amp/quad detector IC, (for example Motorola MC 3356, etc.) The receiver outputs a detected complex signal which is composed of received audio, tone, data, and side tone signals. Such received detector output may be provided to the audio and data processing and control circuit 12 which is conventionally designed and/or programmed to separate the complex signals and output an audio signal (including side tone) at speaker 24. Thus, the operator hears his own voice (as well as any received audio signals) from the speaker 24.

Received data may also be conventionally separated from the complex receiver signals and output at a digital data output port (not shown) from the audio and data processing and control circuit 12. Of course, the SAT (and perhaps some data) is typically utilized by the control circuit 12 as will be appreciated.

Figure 2:
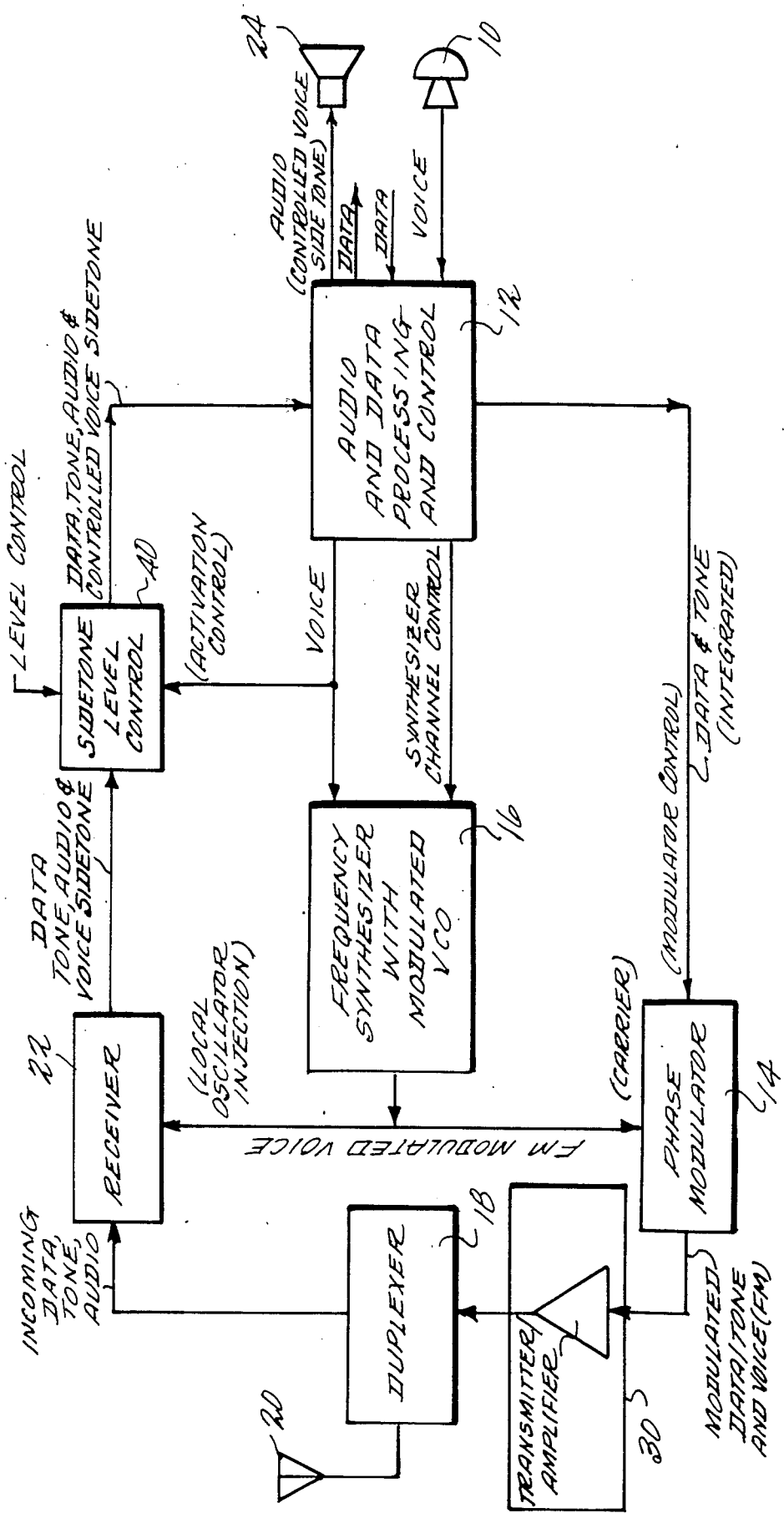
FIG. 2 shows a block diagram of a second embodiment of the present invention.

FIG. 2 shows a block diagram of a second transceiver embodiment of the present invention. In FIG. 2, like components are designated by the same numerals as in FIG. 1. As in FIG. 1, input voice signals are received at microphone 10 and provided to the audio and data processing and control circuit 12. In addition, digital data may be input into the control circuit 12. Integrated data and tone signals are provided to phase modulator 14 which also receives the signal frequency modulated by voice. Phase modulator 14 outputs modulated signals including tone, voice, and data information to conventional transmitter/amplifier circuits 30. Transmitter/amplifier 30 may be of conventional design and provides amplified r.f. signals to duplexer 18 for transmission by antenna 20.

On the receiver side, received signals are provided from antenna 20, duplexer 18, to the receiver 22 as in FIG. 1.

The output of the receiver is provided to a side tone level control circuit 40. Side tone level control 40 also receives the voice signal to be transmitted so that it can automatically detect the occurrences of such signals and activate an amplitude control circuit (e.g. a controlled sidetone attenuator). A manual operator control enables an operator to adjust the level of the resulting side tone voice signal so as to provide a desired controlled volume of side tone at speaker 24. Note that sidetone level control can be done before FM detection by modulating the second injection carrier in a dual conversion receiver with an inverted audio signal from the microphone.

Thus, the side tone level control 40 outputs the detected signal from receiver 22 including data, tone, and audio signals plus a voice side tone signal and the amplitude of such signals may be separately controlled during the time transmitted voice signals occur and thus activate the side tone level control circuit. These complex combined signals are provided to the audio and data processing and control circuit 12 for separation and output to speaker 24 or for output as digital data.

Thus, a low-cost duplex transceiver modulation circuit architecture using but a single frequency source for the transmitter carrier and the receiver local oscillator injection has been realized while at the same time avoiding the undesirable presence of "side tone" transmitted data signals at the receiver output.

While the invention has been described in connection with what is presently considered to be the most practical and preferred embodiments, it is understood that the invention is not to be limited to the disclosed embodiment but, on the contrary, the appended claims are intended to cover all modifications and variations arrangements which retain the novel features and advantages of this invention.

What is claimed is:

1. A duplex radio transceiver for transmitting and receiving voice and data signals comprising:
   an r.f. receiver having a local oscillator injection signal input port and a detected output port;
   a signal synthesizer providing an FM carrier/injection signal which is frequency modulated by said voice signals;
   said receiver local oscillator injection signal port being connected to receive said FM carrier/injection signal;
   a phase modulator connected to also receive said FM carrier/injection signal and to phase modulate such signal by said data signals thereby providing a complex FM output signal; and
   an r.f. transmitter connected to transmit said complex FM output signals.

2. A duplex radio transceiver as in claim 1 further comprising:
   control means connected to said signal synthesizer to control the mean frequency of said FM carrier/injection signal to correspond to a desired r.f. communication channel.

3. A duplex radio transceiver as in claim 1 further comprising:
   an amplitude level control circuit connected in series with the detector output of the r.f. receiver and to said voice signals for controlling the amplitude of side tone voice signals passed through the detector output in response to occurrences of said voice signals.

4. A duplex radio transceiver as in claim 1 wherein said phase modulator comprises:
   a variable impedance device connected for control by said data signals;
   a first port connected to receive said FM carrier/injection signal; and
   a second port connected to provide said complex FM output signals.

5. A duplex radio transceiver for transmitting and receiving data and audio signals, said transceiver comprising:

audio and data processing and control means for providing data signals and voice signals to be transmitted;

frequency synthesizer means coupled to receive said voice signals and to provide a carrier/injection signal frequency modulated by said voice signals;

receiver means for receiving r.f. signals having incoming data and audio signals modulated thereon and having a mixer circuit connected to receive said carrier/injection signal as an injection signal;

phase modulator means connected to receive said frequency modulated carrier/injection signal as one input and to receive said data signals to be transmitted as a second input and to provide a complex modulated signal output; and transmitter means connected to receive and transmit said complex frequency modulated signal.

6. A duplex transceiver according to claim 5 further including sidetone level control means coupled to said receiver means for controlling the amplitude of the sidetone of transmitted audio which results from using said carrier/injection signal as a local oscillator injection signal.

7. A duplex transceiver according to claim 6 wherein said sidetone level control means receives said voice signals from said control means and is adapted to automatically control the side tone signal level in response to occurrences of said voice signals.

8. A duplex transceiver according to claim 7 wherein said data signals include tone signals.

9. A duplex transceiver according to claim 8 wherein said control means generates and provides a synthesizer channel control signal to said synthesizer means for controlling the mean frequency of said carrier/injection signal.

10. A duplex transceiver according to claim 5 wherein said synthesizer means comprises a modulated voltage controlled oscillator.

11. A duplex transceiver according to claim 5 wherein said phase modulator means comprises a quadrature coupler.

12. A duplex transceiver according to claim 5 wherein said receiver means comprises a dual conversion FM receiver.

13. Apparatus for providing digital data, tone and audio modulation in a full duplex radio transceiver having an antenna for receiving r.f. signals modulated with digital data, tone and audio signals, and for transmitting an output r.f. signal modulated by data, tone and voice signals, said apparatus comprising:

duplexer means coupled to said antenna for automatically separating received signals from those to be transmitted;

receiver means, coupled to said duplexer means, for receiving said received signals and a local oscillator injection signal and for providing a complex detected output signal including demodulated digital data, tone, and audio signals;

processing and control means for (a) receiving said detected signal, (b) providing an output audio signal, (c) providing a voice signal to be transmitted, (d) providing digital data and tone signals as a common complex signal;

synthesizer means coupled to receive said voice signal and to provide a frequency-modulated voice signal to said receiver means as said local oscillator injection signal thereby producing a sidetone voice signal in the receiver output and in the audio output from the processing and control means;

phase modulator means, coupled to said synthesizer means and to said control means, for receiving said complex signal and said frequency-modulated voice signal and for providing an FM modulated output signal; and transmitter means connected to receive the output of said phase modulator means and to provide a FM modulated r.f. signal to said duplexer means for transmission.

14. Apparatus according to claim 13 wherein said synthesizer means comprises a voltage controlled oscillator.

15. Apparatus according to claim 13 wherein said phase modulator means comprises a quadrature coupler.

16. Apparatus according to claim 13 wherein said receiver means comprises a dual conversion FM receiver.

17. Apparatus according to claim 13 wherein said control means is adapted to provide an output data signal including data derived from said detected output signal from the receiver means.

18. Apparatus as in claim 13 further comprising:

sidetone level control means coupled between said receiver means and said processing and control means for controlling the amplitude of said sidetone voice signal in response to occurrence of said voice signals to be transmitted.

19. A transceiver as in claim 1 further including means for integrating said data signals and for applying said integrated data signals to said phase modulator, said phase modulator phase modulating said FM carrier/injection signal with said integrated data signals to frequency modulate said FM carrier/injection signal.

20. A transceiver as in claim 5 wherein said audio and data processing and control means includes means for integrating said data signals and for applying said integrated data signals to said phase modulator second input.

21. A transceiver as in claim 5 wherein said phase modulator means produces a complex frequency modulated output signal.

22. A transceiver as in claim 13 wherein said processing and control means includes means for integrating said digital data, and means for summing said integrated digital data and said tone signal to produce said common complex signal.

23. A transceiver as in claim 1 wherein said data signals are Manchester encoded.

24. A transceiver as in claim 5 wherein said audio and data processing and control means provides said data signals in Manchester encoded form.

25. A transceiver as in claim 13 wherein said processing and control means provides said digital data in Manchester encoded form.

26. A transceiver as in claim 1 wherein said receiver produces, at said detected output port, a signal including the following components:

received voice and data signals; and said voice signals modulating said FM carrier/injection signal.

27. A transceiver as in claim 5 wherein said receiver means produces, at a detected output port thereof, a signal including the following components:

said received incoming data and audio signals; and said voice signals to be transmitted.

* * * * *